United States Patent
Herdendorf et al.

(10) Patent No.: US 12,542,181 B2
(45) Date of Patent: Feb. 3, 2026

(54) FIBER BASED OPTICAL MEDIA

(71) Applicant: Seagate Technology LLC, Fremont, CA (US)

(72) Inventors: Brett R. Herdendorf, Mound, MN (US); Riyan Alex Mendonsa, Edina, MN (US); Joachim Walter Ahner, Livermore, CA (US)

(73) Assignee: Seagate Technology LLC, Fremont, CA (US)

(*) Notice: Subject to any disclaimer, the term of this patent is extended or adjusted under 35 U.S.C. 154(b) by 191 days.

(21) Appl. No.: 18/388,924

(22) Filed: Nov. 13, 2023

(65) Prior Publication Data
US 2024/0161825 A1    May 16, 2024

Related U.S. Application Data

(60) Provisional application No. 63/424,993, filed on Nov. 14, 2022.

(51) Int. Cl.
    G11C 13/04    (2006.01)
(52) U.S. Cl.
    CPC .................. *G11C 13/048* (2013.01)
(58) Field of Classification Search
    CPC .................................................... G11C 13/048
    See application file for complete search history.

(56) References Cited

U.S. PATENT DOCUMENTS

| | | | |
|---|---|---|---|
| 5,315,436 A | 5/1994 | Lowenhar et al. | |
| 5,530,666 A * | 6/1996 | Kashyap | G02B 6/28 365/123 |
| 6,999,657 B2 | 2/2006 | Walt | |
| 7,301,888 B2 | 11/2007 | Kasama et al. | |
| 2006/0013108 A1 * | 1/2006 | Maxwell | G11B 7/24003 |
| 2006/0219676 A1 | 10/2006 | Taylor et al. | |
| 2013/0020297 A1 | 1/2013 | Gupta et al. | |
| 2021/0184774 A1 * | 6/2021 | Zhou | G02F 1/225 |

FOREIGN PATENT DOCUMENTS

| | | |
|---|---|---|
| WO | 2010094865 A1 | 8/2010 |
| WO | 2012150566 A1 | 11/2012 |
| WO | 2019158910 A1 | 8/2019 |
| WO | 2020109767 A1 | 6/2020 |
| WO | 2021038225 A1 | 3/2021 |

* cited by examiner

*Primary Examiner* — Min Huang
(74) *Attorney, Agent, or Firm* — Kagan Binder, PLLC

(57) ABSTRACT

Reading data stored on an optical fiber medium includes receiving an optical fiber having data stored thereon in a light-affecting format, guiding the optical fiber through a readback guide system causing a length of the optical fiber to align with an axis, directing light through at least a portion of the optical fiber, the light producing an observable light dispersion pattern based on the light-affecting data stored on the optical fiber, observing the light dispersion pattern as a manner of reading the stored data of the optical fiber, determining the stored data based on the observing the light dispersion pattern, and outputting the determined stored data to a host.

20 Claims, 9 Drawing Sheets

FIBER BASED OPTICAL MEDIA

CROSS-REFERENCE TO RELATED APPLICATIONS

This application claims the benefit of U.S. Provisional Patent Application having Ser. No. 63/424,993 titled "FIBER BASED OPTICAL MEDIA" filed Nov. 14, 2022, the entire contents of which are incorporated by reference for all purposes herein.

FIELD

The present invention is directed to improvements to data storage, and more specifically to improvements to optical media for data storage.

SUMMARY

Disclosed embodiments relate to an optical structure on which data can be stored and read. An example of the data is write-once, read-multiple (WORM) data. Disclosed embodiments utilize an optical fiber instead of a disk media for data storage. Specifically, instead of writing optically-readable data to a wafer substrate or the like, data is instead caused to be written by various means to an optical fiber surface. The data can be written by various methods on the surface of the optical fiber as bits. A core of the optical fiber can then be used as part of a readback channel in various embodiments.

Disclosed embodiments offer improvements for data storage density, overall capacity, longevity, read/write speeds, among other benefits.

According to a first aspect of the present disclosure, a method of reading data stored on an optical fiber medium is disclosed. According to the first aspect, the method includes receiving an optical fiber having data stored thereon in a light-affecting format. The method also includes guiding the optical fiber through a readback guide system causing a length of the optical fiber to align with an axis. The method also includes directing light through at least a portion of the optical fiber, the light producing an observable light dispersion pattern based on the light-affecting data stored on the optical fiber. The method also includes observing the light dispersion pattern as a manner of reading the stored data of the optical fiber. The method also includes determining the stored data based on the observing the light dispersion pattern. The method also includes outputting the determined stored data to a host.

According to a second aspect of the present disclosure, a system is disclosed. According to the second aspect, the system includes a hardware processor operatively coupled to a memory, where the hardware processor configured to execute instructions stored on the memory, including instructions for a process for reading data stored on an optical fiber medium according to the method of reading data stored on an optical fiber medium of the first aspect.

According to a third aspect of the present disclosure, a data storage apparatus from which optically encoded data can be read is disclosed. According to the third aspect, the apparatus includes a length of optical fiber that has been written with optically encoded data along at least a portion of the length thereof. The apparatus also includes a guide system for moving the optical fiber from a first position to a second position, the guide system including a first guide portion that guides the optical fiber in-line with and along an axis and a direction changing element that guides the optical fiber around a bend. The apparatus also includes a light generator for emitting light in the direction of the axis and positioned so that the emitted light passes through a portion of the optical fiber and within the optical fiber to be transmitted within the optical fiber and affected by the optically written data. The apparatus also includes an optical reader for reading a light dispersion pattern from the optical fiber, the optical reader positioned at a determined distance from the coherent light beam generator.

According to a fourth aspect of the present disclosure, a data storage system is disclosed. According to the fourth aspect, the system includes a light source, an optical sensor; and an optical fiber having optical properties. According to the fourth aspect, the optical properties are configured to receive or cause optical disturbances for storing information in the form of one or more voxels. Still according to the fourth aspect, the one or more voxels are configured to store information according to at least one optical characteristic or property selected from the group consisting of: spatial position according to x, y, and/or z-axes, retardance, phase angle, and incidence angle.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein.

DETAILED DESCRIPTION

The present invention is directed to data storage schemes, and more specifically to improvements to data storage using optical media, in particular with respect to data storage density, overall capacity, longevity, read/write speeds among other improvements.

Data storage density and longevity remain challenges in many forms of data storage. One class of data storage that exists today is so-called write-once, read-many (WORM)

media. Some WORM media types are optical in nature, and are sometimes laid out in a one-or-more-layer optical storage format.

Figure 1:
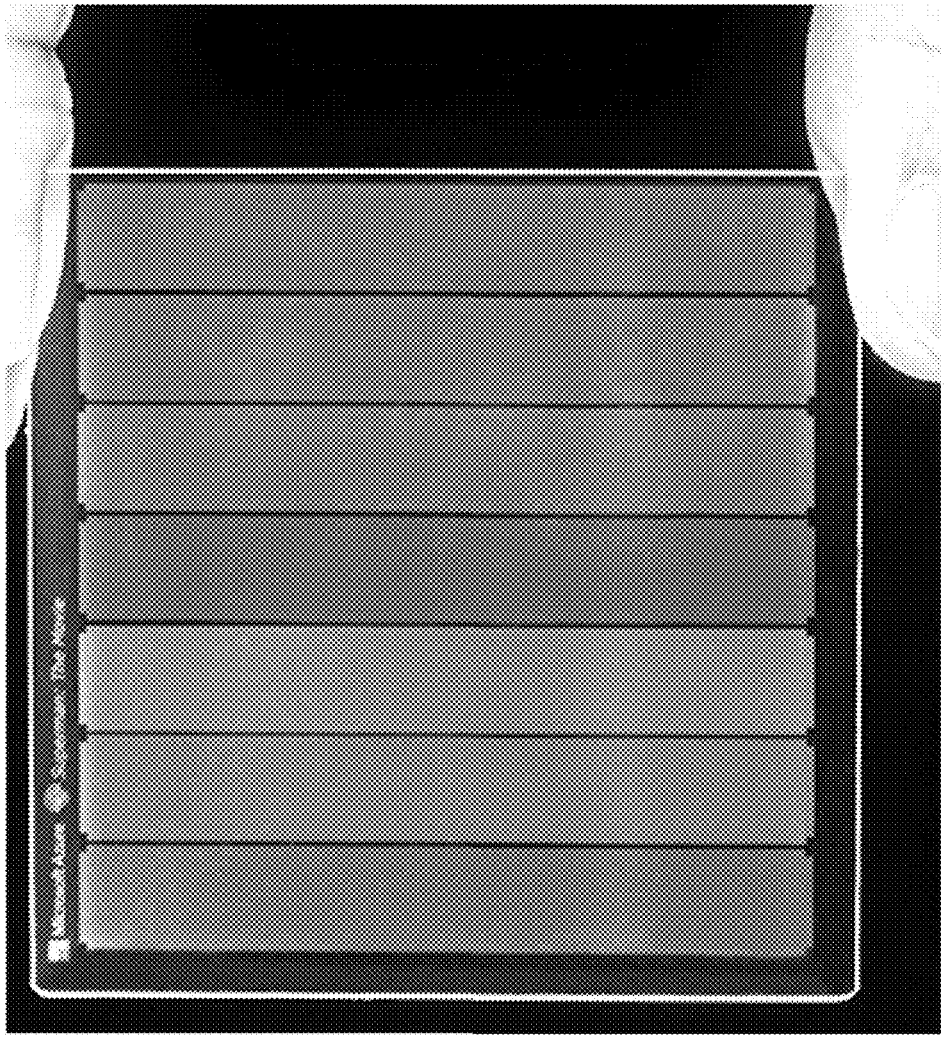
FIG. 1 is an example of an existing disk-based optical storage medium.

With reference to FIG. 1, one such existing WORM data storage format is the existing "5D" optical data storage format shown at 100. As known in the art, "5D" optical data storage includes five "dimensions" of data storage including: three spatial dimensions (x, y, z-axes), along with additional data storage dimensions of phase and retardance as the final two of the total five dimensions. As contemplated herein, phase in some embodiments refers to a phase angle of an optical structure, including various angles (e.g., in terms of a 360-degree range of angles) and/or location/spacing (e.g., such as on the order of nm). As contemplated herein, retardance can be analogous to amplitude of a signal in some embodiments, or a measurement or determination of how much light is reflected, absorbed, and/or passes through a media.

Although a WORM data-storage format is contemplated herein, other, non-WORM data-storage formats are also contemplated herein. For example, various forms of media contemplated herein include rewritable media, e.g., that can be slowly heated, especially in the case of a polymer fiber, and then cooled, such that there is a reflow of fiber materials and a resulting rewritable data-storage format. Alternatively, the rewritable media can include a phase-change material, like a chalcogenide material or the like.

This 5D (wafer-based) optical storage format at 100 has been found to have various drawbacks, such as limited write and readback speed (throughput). Additional challenges of existing 5D optical storage include aspects related to focusing into the media and the complexity of the system in general. A more specific challenge of 5D media also relates to focusing reading and writing aspects on second and subsequent layers of the media (i.e., in the z-axis). As a result, a "z-spacing" or "voxel" layer spacing between layers has been limited in a practical sense to a minimum of approximately five or more microns.

In various embodiments herein a voxel can refer to a volume where data is stored or optically encoded. A voxel can be a three-dimensional analogy to a pixel in a two-dimensional space, in the sense where a pixel is a two-dimensional area where an image is shown, or in some cases a two-dimensional bit where data is stored. Therefore, a voxel can refer to a single bit in three-dimensional space, or an image composed of one or more of said bits. For example, a bit can be either 1 or 0, but a voxel can have a value from 0 to 256, which is equivalent to 8 bits in various embodiments.

This minimum z-spacing has to-date greatly limited the maximum amount of storage available. There is therefore a desire in the optical storage art to develop improvements in the optical media field that solve or avoid the z-spacing limitation in addition to other drawbacks of existing optical storage schemes.

To address various drawbacks, and according to embodiments of the present disclosure, an optical fiber is introduced, which takes the place of existing wafer-based optical storage. The optical fiber can be used as an optical data storage medium, along with other details and variations as described below.

Figure 2:
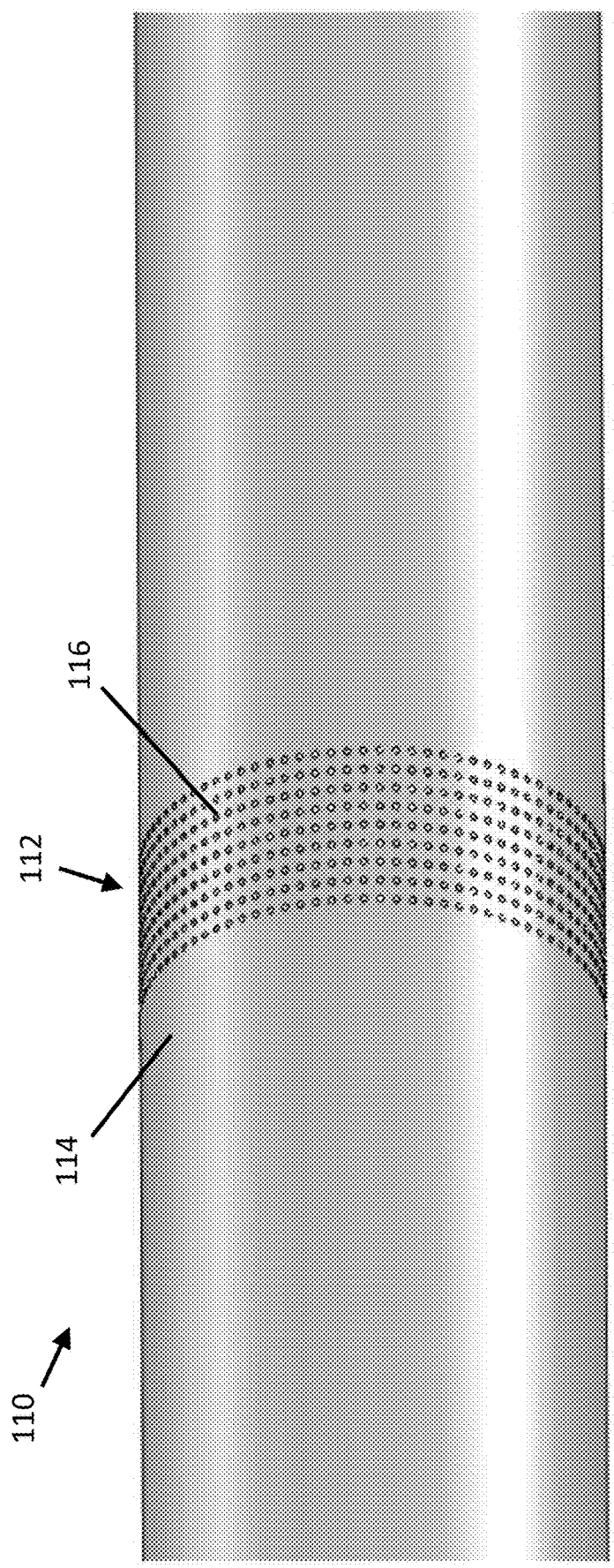
FIG. 2 is a close-up view of a surface of an optical fiber with data stored thereon in rings and rows, according to various embodiments.

FIG. 2 shows an example "4D" optical fiber data storage medium 110. As used herein. "4D" data storage is understood to include two spatial dimensions (along circumference and length of optical fiber, in a curved x-y plane), along with phase and retardance similar to the existing 5D schemes. Various shapes, patterns, angles, layers, or any other dimensions or aspects of the fiber or data stored therein can further be used to modify and/or increase the data storage capacity of optical fibers discussed herein. For example, curvature of the optical fiber media 110 can be used for additional optical encoding and/or storage aspects. For example, an angle of incidence of a writing beam can be known or determined and the angle can be used to see or correlate an angle associated with a written voxel, e.g., with respect to the corresponding curvature or tangent at a point of writing. Many other variations are also contemplated. In embodiments herein, data 112 stored in a 4D optical fiber format can be stored in an outside layer on the surface 114 of the optical fiber media 110. In other embodiments (not shown), the optical fiber media 110 can be written with more than one layer of data stored thereon. Data can be stored on the optical fiber media 110 in a light-affecting format.

FIG. 2 shows an illustration of "4D" optical fiber media 110 with recorded data 112 thereon stored as bits 116, and showing recorded bits on the fiber surface. As shown, the bits 116 can be written on the surface of the fiber, e.g., as a spatial position and stored information, using various writing techniques, and can be referred to as "voxels." Example writing techniques include using optical techniques like multi-pulsed polarized femtosecond laser pulses, probe techniques, or any other optical writing methods. A write process can be similar to 5D or even be probe based where distortions are made on the surface 114 of the fiber 110, either due to mechanical, optical or thermal effects Still with reference to FIG. 2, by using an optical fiber-based system and media 110 rather than a substrate, a 4D methodology results (two physical dimensions plus phase and retardance) that uses the fiber core (not shown) as part of a readback channel and the surface 114 as the recording medium.

The optical fiber media 110 can be a plastic fiber in various embodiments, and as shown, the data bits 116 can be arranged in a cylindrical grid composed of rings and rows of data-storing bits 116. A diameter of the optical fiber media 110 can be chosen such that the surface area compared to volume and recording density exceeds that of a sheet medium, which loses data volumetric density in the z-direction. It has been observed that density of data stored per unit volume on the fiber media can be increased as the fiber 110 diameter is reduced, up to a certain point. Although various embodiments herein focus on a surface-only and single-layer data storage format on the optical fiber media 110, various layered embodiments are also contemplated herein. Although referred to herein primarily as "4D" optical media, the fiber media can further be recorded in any of various additional or third (spatial) dimensions enabling a 5D-type data stored optical fiber.

Figure 4:
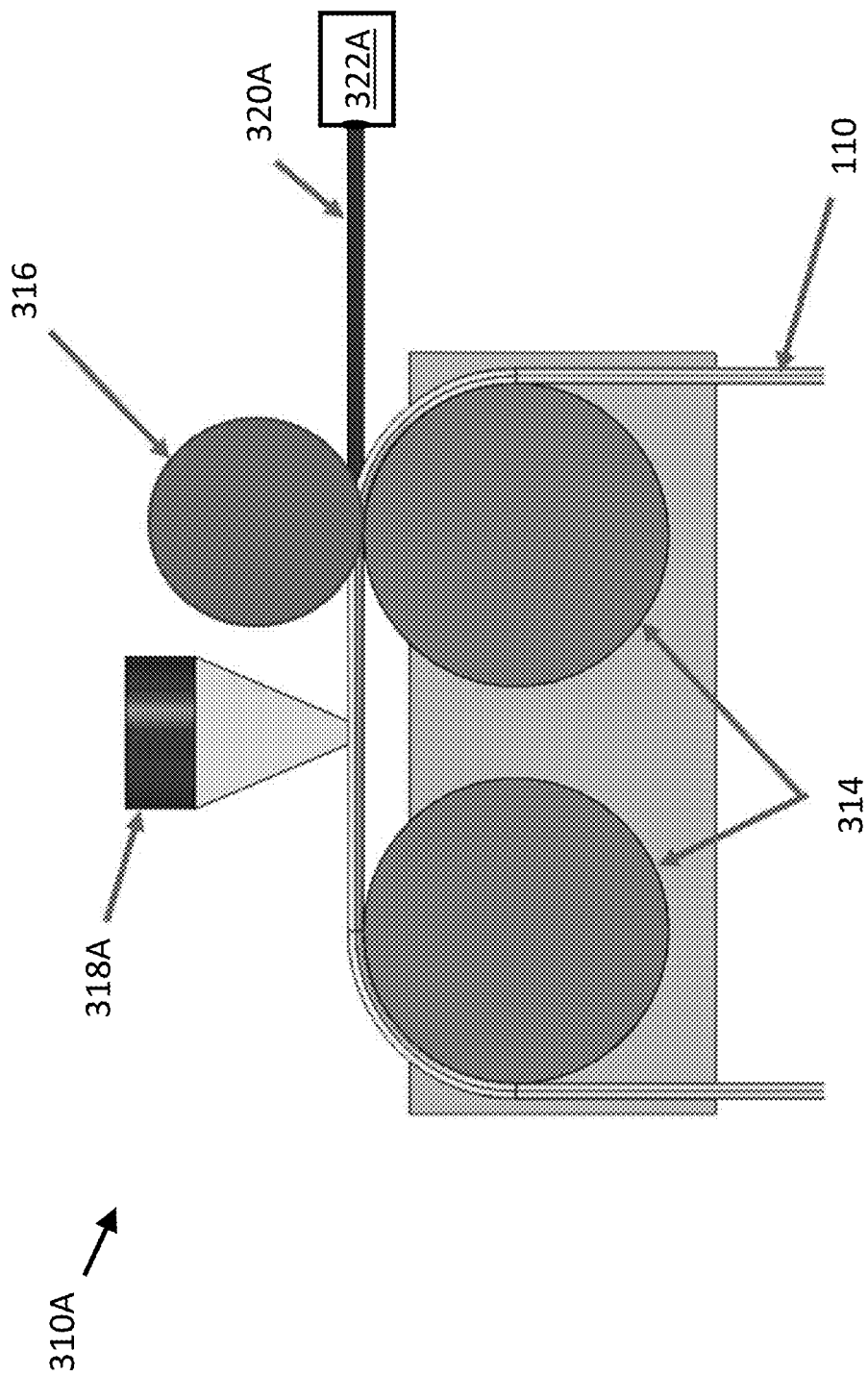
FIG. 4 is a first embodiment of a system for reading data stored on an optical fiber, according to various embodiments.
Figure 5:
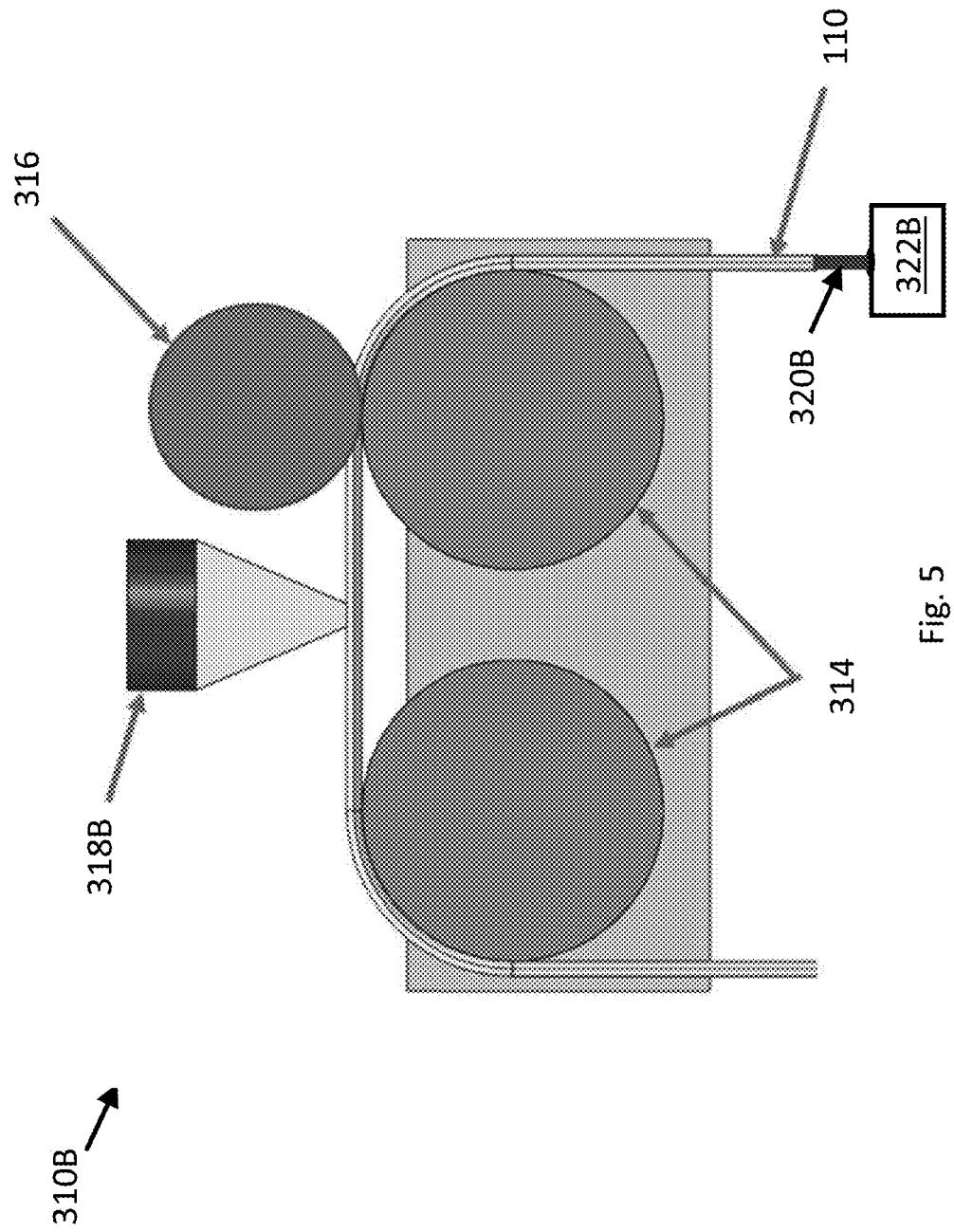
FIG. 5 is a second embodiment of a system for reading data stored on an optical fiber, according to various embodiments.
Figure 6:
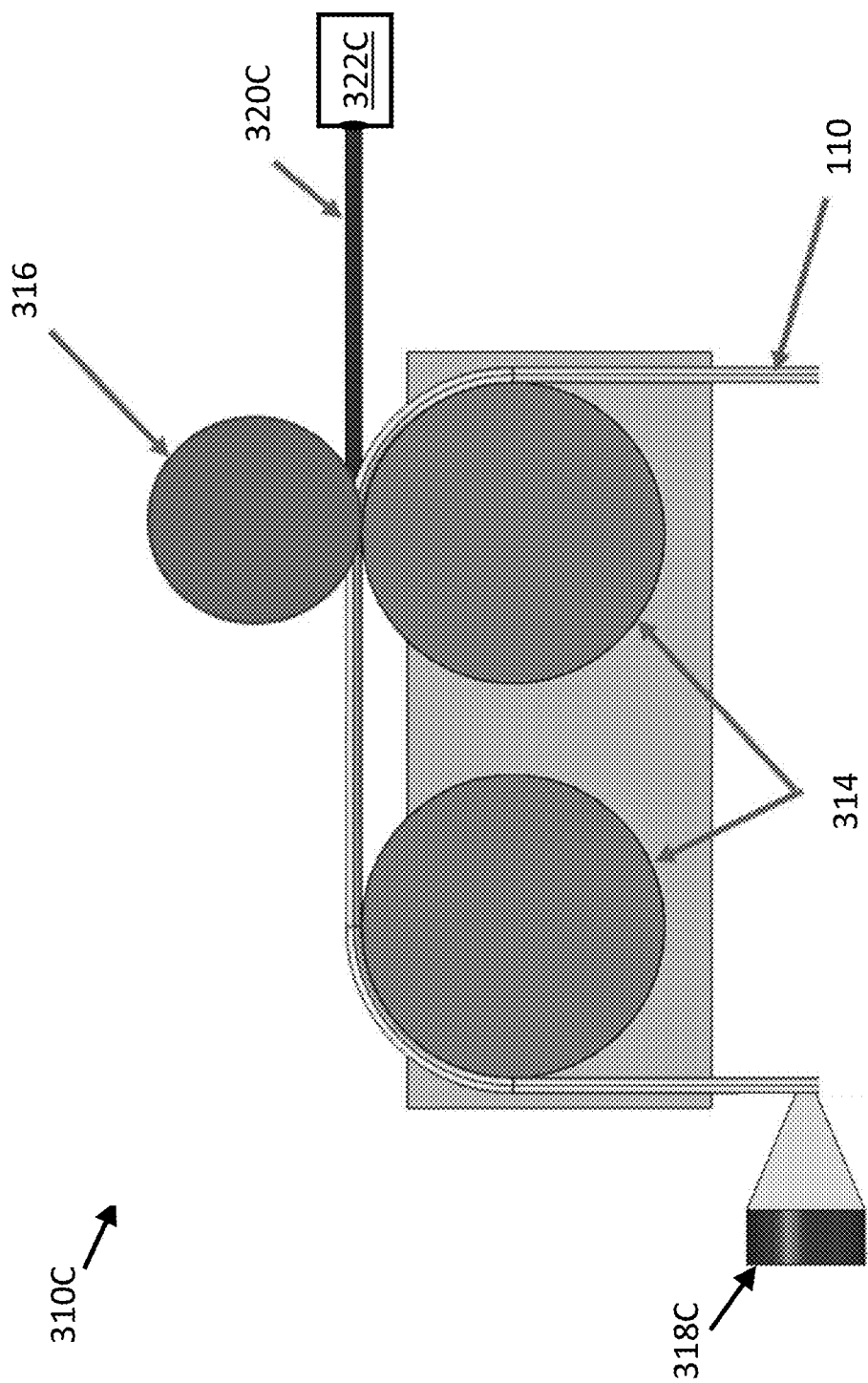
FIG. 6 is a third embodiment of a system for reading data stored on an optical fiber, according to various embodiments.
Figure 8:
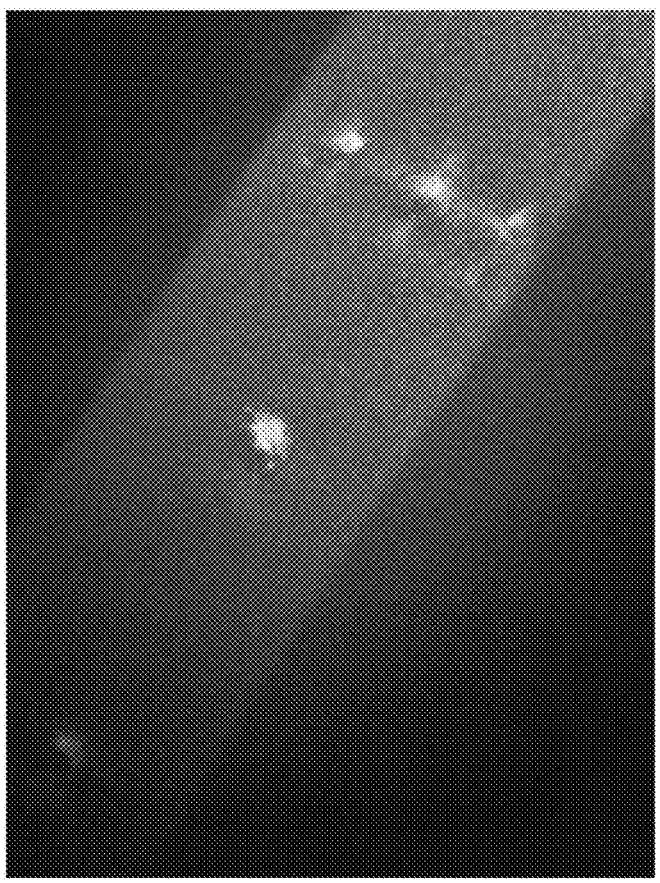
FIG. 8 shows experimental data of a second light dispersion pattern, according to various embodiments.
Figure 7:
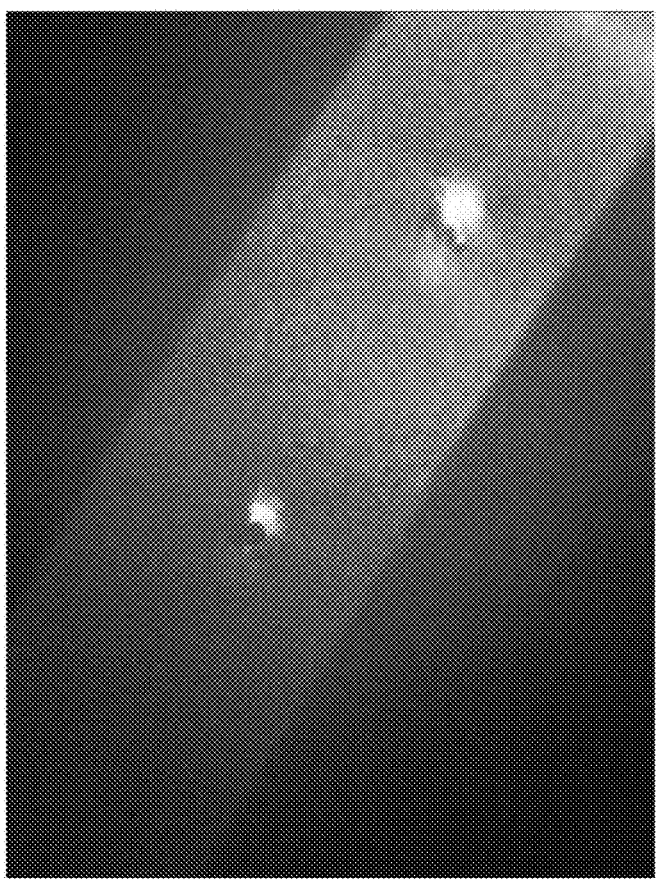
FIG. 7 shows experimental data of a first light dispersion pattern, according to various embodiments.

A light source applied to the 4D optical media fiber 110 can result in an observable dispersed output of the information stored in the voxel (as described above), which can then can be read through the fiber 110 in a number of possible ways. Various examples of such readback systems are shown in FIGS. 4-6. Readback can be as shown in FIG. 4, or light can be directed onto the bit and its dispersion can be seen through the ends of the fiber, among other variations. Various reading positioning and setup options include passing light through a bend in the fiber, through one end of the fiber, or even at the written bit and then seeing the output through the other end of the fiber or at the bit. Actual results of readback by shining a coherent light beam (e.g., a laser) through a bend in the fiber and it being dispersed by the written bit, and associated data from experimentation, are shown in FIGS. 7 and 8. Examples of readback setups can include an optical reader positioned at a determined distance from the optical media fiber 110, a projected voxel therefrom, or any other physical component or optical projection.

Examples of the optical fiber discussed herein can be composed of a core (interior) and cladding (exterior). The core and cladding can each have optical properties, and can be the same material and/or index of refraction or different in various embodiments. When using an optical fiber with different refractive indexes for core and cladding structure, modification can be performed at the core/cladding interface. The readback illumination could be mediated through the core as well as through the cladding structure. Multimode illumination can be utilized to achieve spectral discrimination.

Since, as shown, the optical fiber (e.g., 110) has a curved surface and resulting media, it is possible to additionally use the dimension of incidence angle for alternative reading/writing processes to add yet another dimension of data storage and readback.

In various embodiments, the fiber can alternatively be made of glass, or other suitable materials provided the material has the required optical properties, including enabling desired light wavelengths to pass through and that enables a comparable number of bits per voxel. In various embodiments, contemplated optical properties are configured to receive disturbances for storing information in the form of one or more voxels, where the one or more voxels are configured to store information in the form of and/or according to at least one optical characteristic or property selected from: spatial position according to x, y, and/or z-axes, retardance, phase angle, and incidence angle. The media can be optical fiber such as a polymer. If a polymer is used, possible options to reflow the polymer by heating (through optical or mechanical means) are possible, e.g., to make the media multi-write capable.

Figure 3:
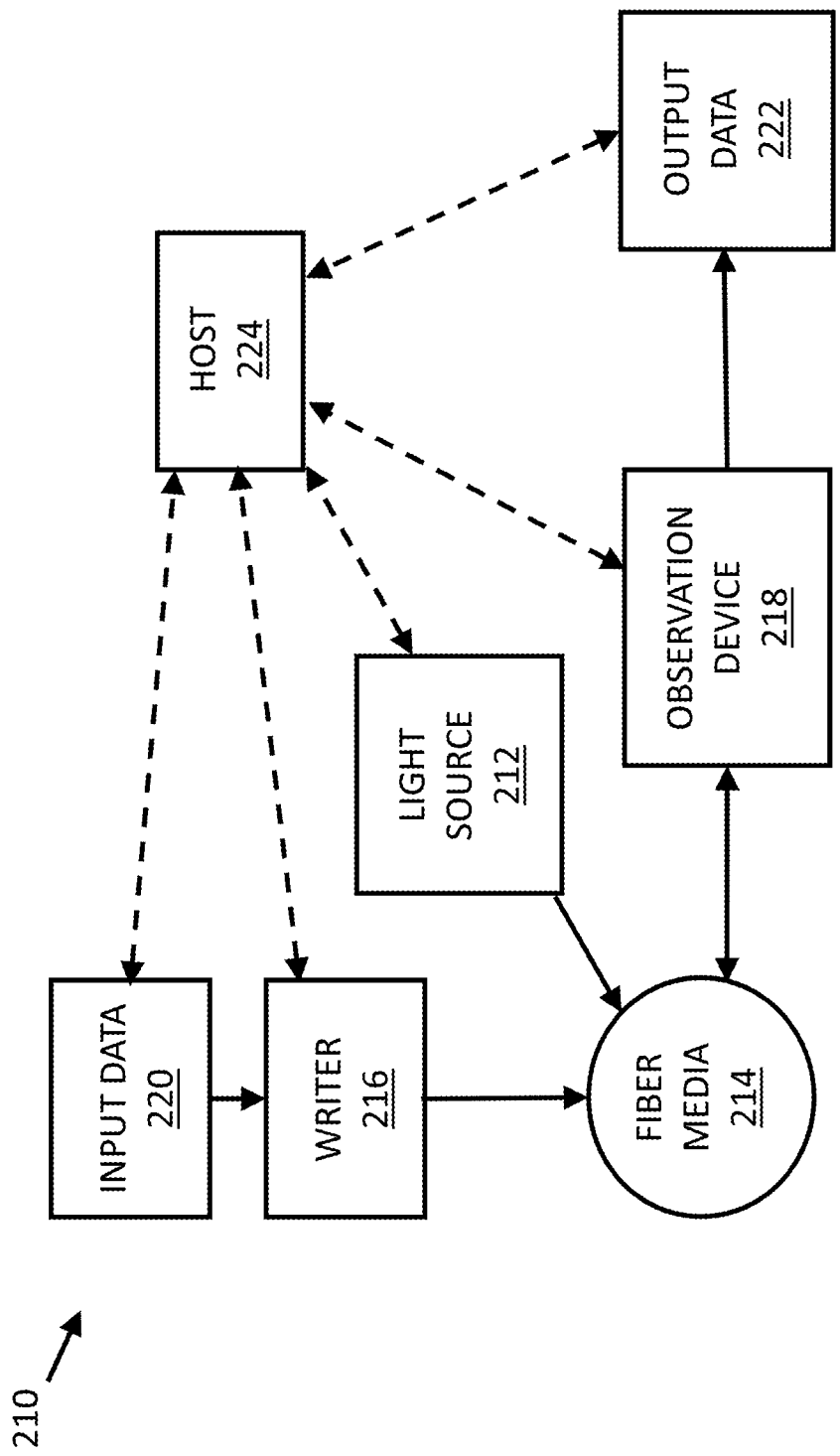
FIG. 3 is a schematic diagram of a fiber optic optical storage system, according to various embodiments.

FIG. 3 is a schematic diagram of a fiber optic optical storage system 210, according to various embodiments. As shown, a fiber media 214 is provided, and a host 224 is variously in communication with various components of the system 210. For example, the host 224 is optionally in communication with input 220, a writer 216, a light source 212, an observation device 218, and/or output data 222. The writer 216 can be configured to receive input data 220 and then write the input data 220 to the fiber media 214. The light source 212 can then provide light to the fiber media 214 written with input data 220 such that the observation device 218 can view the input data 220 as written to the fiber media 214. The data read at the observation device 218 can then be formatted as output data 222, and optionally can be transmitted to the host 224 or the like.

Of note, "z"-spacing (in the z-direction) has been a challenge for wafer-based 5D storage, due at least in part to difficulty in reliably reading deep into the wafer, at multiple layers of data below the surface. Present embodiments preferably utilize a surface layer of data, although in various alternative embodiments, two or more layers of optical data can be written and read from the optical fiber. Some challenges relating to multi-layer storage include difficulty with proper focus through layers. By spacing layers accordingly, focus can be achieved. Another challenge includes absorption caused by layers above the target layer of the signal and/or light source.

As envisioned, it is possible in various embodiments to utilize fiber media to get more surface area for a given volume of media material. It is also possible to use a flexible substrate in a non-fiber media format, like a tape. The media material could in some cases be a monolithic material, either a polymer or flexible glass, or it could be multi material, with reinforcement materials made out of two-dimensional (2D) materials, as well as coating and protective layers. The media could be written on one media surface only or on both (or multiple) media surfaces. In various embodiments, a reflector could be positioned in between an outer and an inner layer. It is also possible to use a non-flexible, thin material with reinforcement materials or features.

Table 1, below, shows basic calculations that illustrate when disclosed 4D fiber media provides a better option over the existing 5D substrate recording in a sheet (see FIG. 1), in terms of areal density. Table 1 shows calculated sizes, voxels, and areal density for fiber media (4D) compared to wafer (5D) media. As shown, a crossover of preference can occur between about 3 and 4 micrometers of z-spacing.

TABLE 1

Example Raw Data Density Calculations Showing Potential Raw Capacity of 5D Optical and 4D Fiber.

| | Sheet Size | voxel |
|---|---|---|
| 1 um for all dimensions | | |
| 5D Sheet | | |
| X dimension (mm) | 100 | 0.001 |
| Y dimension (mm) | 100 | 0.001 |
| Z dimension (mm) | 2 | 0.001 |
| Volume | 20000 | |
| Bytes (assuming 8 bits per voxel) | 2E+13 | |
| 4D Fiber | | |
| Diameter (mm) | 0.01 | |
| Circumference (mm) | 0.03141 | |
| dot spacing factor | 1 | |
| dots per fiber | 3.14E+06 | |
| number of fibers in 2 × 100 × 100 mm volume | 2.00E+06 | |
| Amount of bytes in same volume | 6.28E+12 | |
| 1 um for XY and 5 um for Z | | |
| 5D Sheet | | |
| X dimension (mm) | 100 | 0.001 |
| Y dimension (mm) | 100 | 0.001 |
| Z dimension (mm) | 2 | 0.005 |
| Volume | 20000 | |
| Bytes (assuming 8 bits per voxel) | 4E+12 | |
| 4D Fiber | | |
| Diameter (mm) | 0.01 | |
| Circumference (mm | 0.03141 | |
| dot spacing factor | 1 | |
| dots per fiber | 3.14E+06 | |
| number of fibers in 2 × 100 × 100 mm volume | 2.00E+06 | |
| Amount of bytes in same volume | 6.28E+12 | |

Therefore, and based on the above calculations, embodiments of the present disclosure are preferable in particular for voxel spacing in a z-coordinate of about 3 or more microns, which shows particular benefits of the fiber-based media compared to the existing wafer-based media at greater z-coordinate voxel spacing.

In optional embodiments, fluorescence-based recording techniques can be utilized for reading/writing data to/from the optical fiber, with the illuminating wavelengths passed through fiber for reading. If using fluorescence, can use different methods and techniques to achieve a smaller voxel, like stimulation emission depletion (STED) microscopy or near-field optics.

With reference now to FIGS. 4-6, and with reference first to FIG. 4, a system 310A includes a stabilizing readback guide system (including pulleys 314 and rubber pinch rollers 316) or the like, which is used to feed and align an optical fiber media 110, optically along an axis associated with the guide system, such that a laser 322A (an example of a light source) and beam thereof 320A is emitted onto or into the optical fiber media 110. Optionally, the optical fiber media 110 is guided through the guide system such that a length of the optical fiber media 110 is caused to align with the axis. Optionally, the guide system is configured to move the optical fiber media 110 from a first position to a second position, the guide system including a first guide portion that guides the optical fiber in-line with and along an axis and a direction changing element that guides the optical fiber media 110 around a bend. Light can then be directed through at least a portion of the optical fiber media 110, the light producing an observable light dispersion pattern (or image) based on light-affecting data stored on the optical fiber media 110. The observing can be done by observing a portion of the optical fiber media 110 along a respective length, or through an end thereof.

For example, the beam 320A can be emitted within a core of the optical fiber media 110 through a bend of the fiber. In various embodiments, light can be directed transversely, longitudinally, or at an angle (based on an axis of the optical fiber media 110) through a side of the optical fiber media 110. A dispersed laser image, such as one or more voxels, results from the written bit and such laser dispersion is readable by an optical sensor 318A. The dispersed laser image, optionally a light dispersion pattern, can then be observed as a manner of reading data stored on the optical fiber media 110. When the laser 322A light 320A is dispersed, the laser image can form a data-encoding (or otherwise data-containing) pattern. In this way, the optical sensor 318A can read data stored on the optical fiber media 110 (correlated therewith, related thereto, or encoding data thereof) without risk of altering the data stored on the optical fiber media 110. In various embodiments, the one or more voxels can be configured to store information in the form of and/or according to at least one optical characteristic. Stored data on the optical fiber media 110 can be determined based on the observing the light dispersion pattern, and stored data can then be output to a host. Examples of optical characteristics include spatial position according to x, y, and/or z-axes, retardance, phase angle, and incidence angle, among others.

With reference to FIG. 5, a system 310B includes a laser or light source 322B and resulting beam 320B can be shone through an end of the fiber 212, and the optical sensor 318B can be located in a similar position as shown in FIG. 4. Various embodiments include certain positioning of various components of the system 310B. Positioning can affect how data is read, and an understanding of a beam path is beneficial for optimal performance accordingly. In some examples, a fiber length can be too long for practical reading, and various positioning, sizing, and the like are therefore contemplated herein.

In FIG. 6, a system 310C includes a light source 322C and beam 320C in a position similar to FIG. 4, but the optical sensor 318C is positioned proximate an end of the fiber 110. It is to be understood that many other variations of locations configurations can be optionally utilized, and the light sources 322, beams 320, and optical sensors 318 can be positioned at any point relating to the optical fiber media 110.

In various embodiments, light can be shone from outside-in, inside-out, or through an end of the fiber media, and sensing can be done from the outside-in, inside-out, or through an end of the fiber media, among other variations.

In yet further embodiments, data can also be read simultaneously around the circumference of a fiber, or in linear lines and then read back and forth, while slowly rotating the fiber. In even yet further embodiments, it is contemplated to write data in a format is in a helical format, similar to a screw thread. This data can be written by rotating slowly as a length of the fiber is traversed by a writing mechanism (or the fiber can be moved alternatively, or both). Readback can be done similarly, need not be in the same implementation as the writing mechanism and process, but can be same or similar for reading as writing in some embodiments.

FIG. 7 shows experimental data of a first light dispersion pattern, according to various embodiments. As shown, a dispersion pattern and voxel are shown in a concentrated image 410. In more detail, as shown, an output of two voxels written linearly along a length of a fiber is shown.

FIG. 8 shows experimental data of a second light dispersion pattern, according to various embodiments. As shown, a dispersion pattern and voxel are shown in a spread, three-part image 412. Shown in FIG. 8 is a readback of multiple bits/voxels written concentrically around the fiber (e.g., 3 voxels), compared to a single voxel shown in FIG. 7.

Figure 9:
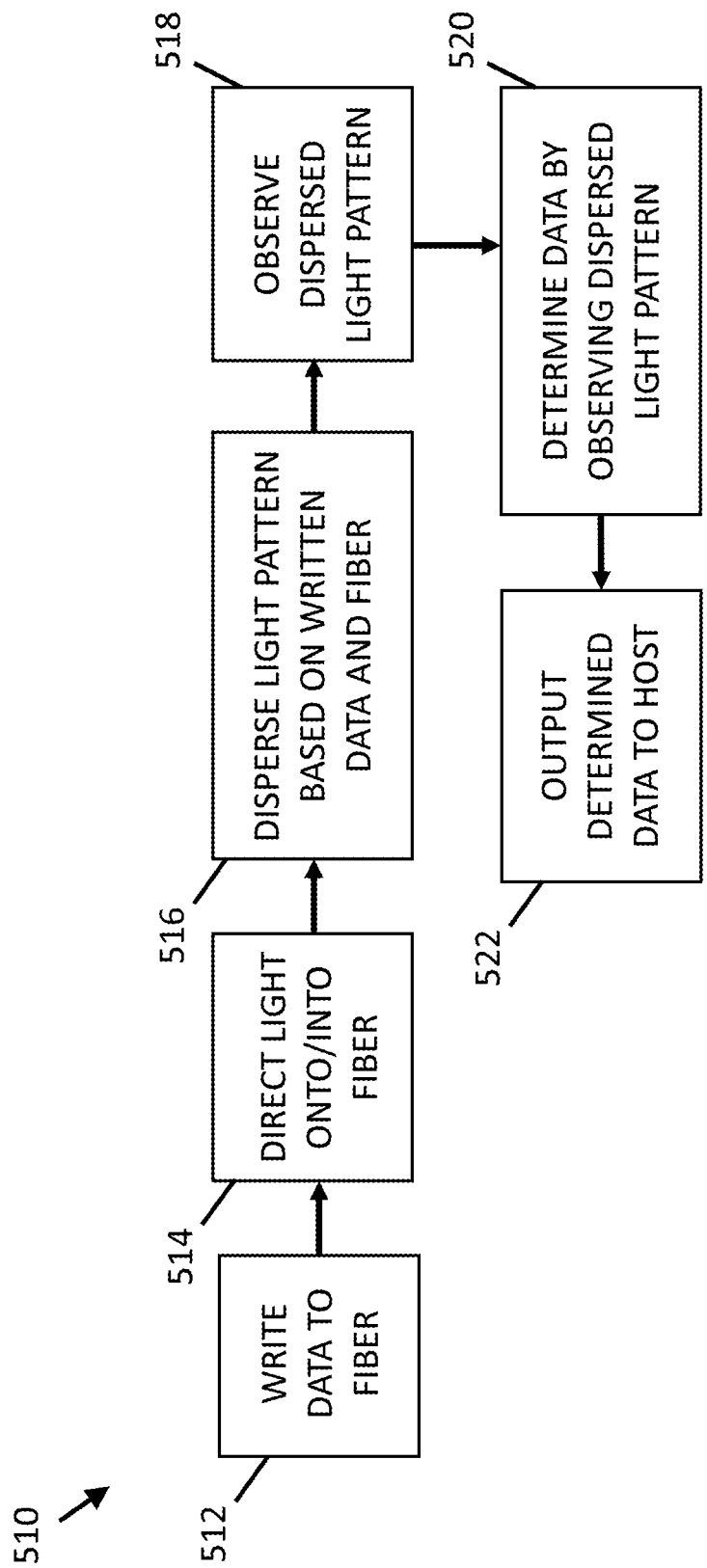
FIG. 9 is a flowchart of a process, according to various embodiments.

FIG. 9 is a flowchart of a process 510, according to various embodiments. According to process 510, data can be written to a fiber at operation 512. At operation 514, light can be directed onto/into the fiber. At operation 516, a light pattern can be dispersed based on the written data and fiber. At operation 518, the dispersed light pattern can be observed. At operation 520, data can be determined by observing the dispersed light pattern. At operation 522, an output based on the determining at operation 520 can be output to a host.

Figure 10:
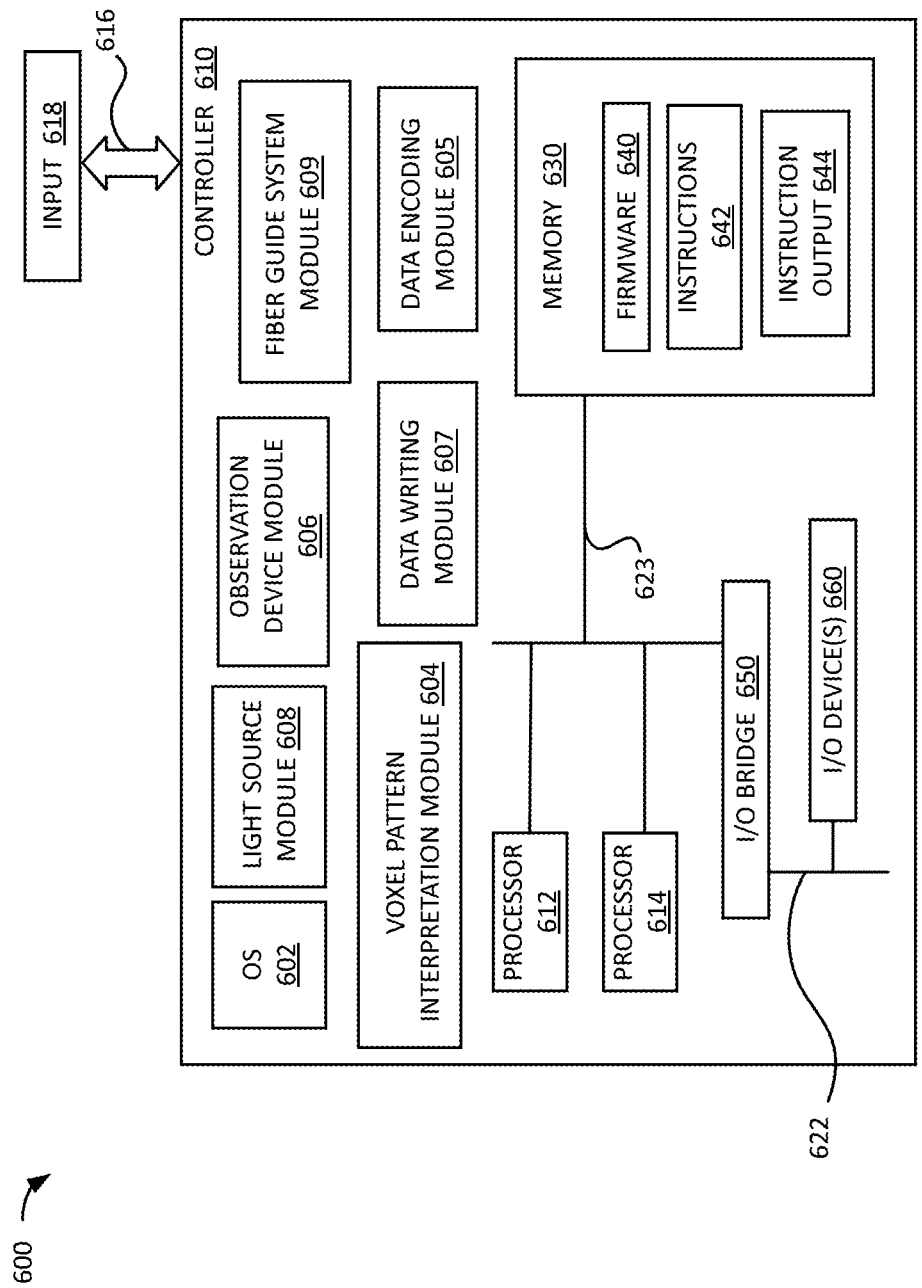
FIG. 10 is a block schematic diagram of a computer system according to embodiments of the present disclosure.

FIG. 10 is a block schematic diagram of a computer system 600 according to embodiments of the present disclosure. The computer system 600 can be implemented according to the various embodiments of FIGS. 1-9.

Computer system 600, as shown, is configured with an interface 616 to enable controller 610 to read, write, disperse, illuminate, interpret, decode, or otherwise handle optical data stored on an optical fiber, as described in particular with regard to FIGS. 1-9, above. Optionally, the controller 610 can be used interchangeably with the term and concepts related to the host, or can be in communication with the host, as described above, as applicable. An input 618 may be received at interface 616. In embodiments, the interface 616 can enable controller 610 to receive, or otherwise access, the input 618 via, for example, a network (e.g., an intranet, or a public network such as the Internet), or a storage medium, such as a disk drive internal or connected to controller 610. The interface can be configured for human input or other input devices, such as described later in regard to components of controller 610. It would be apparent to one of skill in the art that the interface can be any of a variety of interface types or mechanisms suitable for a computer, or a program operating in a computer, to receive or otherwise access or receive a source input or file.

Hardware processors 612, 614 included in controller 610 are connected by a memory interface 620 to memory device or module 630. In embodiments, the memory 630 can be a cache memory, a main memory, a flash memory, or a combination of these or other varieties of electronic devices capable of storing information and, optionally, making the information, or locations storing the information within the memory 630, accessible to a processor. Memory 630 can be formed of a single electronic (or, in some embodiments, other technologies such as optical) module or can be formed of a plurality of memory devices. Memory 630, or a memory device (e.g., an electronic packaging of a portion of a memory), can be, for example, one or more silicon dies or chips, or can be a multi-chip module package. Embodiments can organize a memory as a sequence of bit, octets (bytes), words (e.g., a plurality of contiguous or consecutive bytes), or pages (e.g., a plurality of contiguous or consecutive bytes or words).

In embodiments, computer 600 can include a plurality of memory devices. A memory interface, such as 620, between one or more processors and one or more memory devices can be, for example, a memory bus common to one or more processors and one or more memory devices. In some embodiments, a memory interface, such as 623, between a processor (e.g., 612, 614) and a memory 630 can be point to point connection between the processor and the memory, and each processor in the computer 600 can have a point-to-point connection to each of one or more of the memory devices. In other embodiments, a processor (for example, 612) can be connected to a memory (e.g., memory 630) by means of a connection (not shown) to another processor (e.g., 614) connected to the memory (e.g., 623 from processor 614 to memory 630).

Computer 600 can include an input/output (I/O) bridge 650, which can be connected to a memory interface 620, or to processors 612, 614. An I/O bridge 650 can interface the processors 612, 614 and/or memory devices 630 of the computer 600 (or, other I/O devices) to I/O devices 660 connected to the bridge 650. For example, controller 610 includes I/O bridge 650 interfacing memory interface 623 to I/O devices, such as I/O device 660. In some embodiments, an I/O bridge can connect directly to a processor or a memory, or can be a component included in a processor or a memory. An I/O bridge 650 can be, for example, a peripheral component interconnect express (PCI-Express) or other I/O bus bridge, or can be an I/O adapter.

The I/O bridge 650 can connect to I/O devices 660 by means of an I/O interface, or I/O bus, such as I/O bus 622 of controller 610. For example, I/O bus 622 can be a PCI-Express or other I/O bus. I/O devices 660 can be any of a variety of peripheral I/O devices or I/O adapters connecting to peripheral I/O devices. For example, I/O device 660 can be a graphics card, keyboard or other input device, a hard disk drive (HDD), solid-state drive (SSD) or other storage device, a network interface card (NIC), etc. I/O devices 660 can include an I/O adapter, such as a PCI-Express adapter, that connects components (e.g., processors or memory devices) of the computer 600 to various I/O devices 660 (e.g., disk drives, Ethernet networks, video displays, keyboards, mice, styli, touchscreens, gesture-based control, sensors, etc.).

Computer 600 can include instructions executable by one or more of the processors 612, 614 (or, processing elements, such as threads of a processor). The instructions can be a component of one or more programs. The programs, or the instructions, can be stored in, and/or utilize, one or more memory devices of computer 600. As illustrated in the example of FIG. 10, controller 610 includes a plurality of programs or modules, such as light source module 608, observation device module 606, fiber guide system module 609, voxel pattern interpretation module 604, data writing module 607, and data encoding module 605. A program can be, for example, an application program, an operating system (OS) or a function of an OS, or a utility or built-in function of the computer 600. A program can be a hypervisor, and the hypervisor can, for example, manage sharing resources of the computer 600 (e.g., a processor or regions of a memory, or access to an I/O device) among a plurality of programs or OSes.

Programs can be "stand-alone" programs that execute on processors and use memory within the computer 600 directly, without requiring another program to control their execution or their use of resources of the computer 600. For example, controller 610 includes (optionally) stand-alone programs in light source module 608, observation device module 606, fiber guide system module 609, voxel pattern interpretation module 604, data writing module 607, and data encoding module 605. A stand-alone program can perform particular functions within the computer 600, such as controlling, or interfacing (e.g., access by other programs) an I/O interface or I/O device. A stand-alone program can, for example, manage the operation, or access to, a memory (e.g., memory 630). A basic I/O subsystem (BIOS), or a computer boot program (e.g., a program that can load and initiate execution of other programs) can be a standalone program.

Controller 610 within computer 600 can include one or more OS 602, and an OS 602 can control the execution of other programs such as, for example, to start or stop a program, or to manage resources of the computer 600 used by a program. For example, controller 610 includes OS 602, which can include, or manage execution of, one or more programs, such as OS 602 including (or, managing) light source module 608, observation device module 606, fiber guide system module 609, voxel pattern interpretation module 604, data writing module 607, and data encoding module 605. In some embodiments, an OS 602 can function as a hypervisor.

A program can be embodied as firmware (e.g., BIOS in a desktop computer, or a hypervisor) and the firmware can execute on one or more processors and, optionally, can use memory, included in the computer 600. Firmware can be stored in a memory (e.g., a flash memory) of the computer 600. For example, controller 610 includes firmware 640 stored in memory 630. In other embodiments, firmware can be embodied as instructions (e.g., comprising a computer program product) on a storage medium (e.g., a CD-ROM, DVD-ROM, flash memory, or disk drive), and the computer 600 can access the instructions from the storage medium.

In embodiments of the present disclosure, computer 600 can include instructions for optical data reading and writing. Controller 610 includes, for example, light source module 608, observation device module 606, fiber guide system module 609, voxel pattern interpretation module 604, data writing module 607, and data encoding module 605, which can operate to provide optical data storage and related aspects according to various embodiments herein.

The example computer system 600 and controller 610 are not intended to be limiting to embodiments. In embodiments, computer system 600 can include a plurality of processors, interfaces, and inputs and can include other elements or components, such as networks, network routers or gateways, storage systems, server computers, virtual computers or virtual computing and/or I/O devices, cloud-computing environments, and so forth. It would be evident to one of skill in the art to include a variety of computing devices interconnected in a variety of manners in a computer system embodying aspects and features of the disclosure.

In embodiments, controller 610 can be, for example, a computing device having a processor (e.g., 612) capable of executing computing instructions and, optionally, a memory 630 in communication with the processor. For example, controller 610 can be a desktop or laptop computer; a tablet computer, mobile computing device, personal digital assistant (PDA), or cellular phone; or, a server computer, a high-performance computer (HPC), or a super computer, any of which can be a host, in communication with a host, or associated with a host, as described herein. Controller 610 can be, for example, a computing device incorporated into a wearable apparatus (e.g., an article of clothing, a wristwatch, or eyeglasses), an appliance (e.g., a refrigerator, or a lighting control), a mechanical device, or, e.g., a motorized vehicle. It would be apparent to one skilled in the art that a computer embodying aspects and features of the disclosure can be any of a variety of computing devices having processors and, optionally, memory devices, and/or programs.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A method of reading data stored on an optical fiber medium, comprising:
   receiving an optical fiber having data stored thereon in a light-affecting format;
   guiding the optical fiber through a readback guide system causing a length of the optical fiber to align with an axis;
   directing light through at least a portion of the optical fiber, the light producing an observable light dispersion pattern defined by one or more voxels written to the optical fiber and based on the light-affecting data stored on the optical fiber, wherein each voxel defines a volume written to the optical fiber to optically encode at least one stored bit of the light-affecting data in three-dimensional space;
   observing the light dispersion pattern as a manner of reading the stored data of the optical fiber;
   determining the stored data based on the observing the light dispersion pattern; and
   outputting the determined stored data to a host.

2. The method of claim 1, wherein the light is directed along the axis.

3. The method of claim 1, wherein the directed light is a beam of coherent light.

4. The method of claim 3, wherein the beam of coherent light is produced by a laser.

5. The method of claim 2, wherein the light directed along the axis is further directed to emit within the optical fiber.

6. The method of claim 5, wherein the light is directed through a bend in the optical fiber adjacent the length of the optical fiber aligned with the axis.

7. The method of claim 5, wherein the light is directed transversely or at an angle through a side of the optical fiber.

8. The method of claim 5, wherein the light is directed longitudinally through an end of the optical fiber.

9. The method of claim 1, wherein the observing the light dispersion pattern is done by observing a portion of the optical fiber along the length.

10. The method of claim 1, wherein the observing the light dispersion pattern is done by observing a portion of the optical fiber through an end of the optical fiber.

11. The method of claim 1, wherein the data stored on the optical fiber comprises write-once, read-multiple data, wherein the write-once, read-multiple data are stored as bits.

12. The method of claim 11, wherein the data is written to at least a surface the optical fiber by at least one of mechanical, optical, and thermal effects.

13. A data storage apparatus from which optically encoded data can be read, comprising:
   a length of optical fiber that has been written with optically encoded data along at least a portion of the length thereof;
   a guide system for moving the optical fiber from a first position to a second position, the guide system including a first guide portion that guides the optical fiber in-line with and along an axis and a direction changing element that guides the optical fiber around a bend;
   a light generator for emitting light in the direction of the axis and positioned so that the emitted light passes through a portion of the optical fiber and within the optical fiber to be transmitted within the optical fiber and affected by the optically written data; and
   an optical reader for reading a light dispersion pattern comprising one or more voxels from the optical fiber, wherein each voxel defines a volume written to the optical fiber that optically encodes at least one stored bit of the optically written data in three-dimensional space, and wherein the optical reader is positioned at a determined distance from the light generator.

14. The data storage apparatus of claim 13, wherein the optically encoded data comprises write-once, read-multiple data, wherein the write-once, read-multiple data are stored as bits.

15. A data storage system, comprising:
   a light source;
   an optical sensor; and
   an optical fiber comprising optical properties, wherein the optical properties are configured to receive or cause optical disturbances for storing information in the form of one or more voxels, wherein each voxel defines a volume written to the optical fiber to optically encode at least one stored bit of light-affecting data in three-dimensional space, and
   wherein the one or more voxels are configured to encode information according to at least one optical characteristic or property selected from the group consisting of: spatial position according to x, y, and/or z-axes, retardance, phase angle, and incidence angle.

16. The data storage system of claim 15, wherein the information stored on the optical fiber comprises write-once, read-multiple data, wherein the write-once, read-multiple data are stored as bits.

17. The method of claim 1, wherein the light dispersion pattern is configured to encode information according to at least one optical characteristic or property selected from the group consisting of: spatial position according to x, y, and/or z-axes, retardance, phase angle, and incidence angle.

18. The data storage apparatus of claim 13, wherein the light dispersion pattern is defined by one or more bits written to the optical fiber.

19. The method of claim 1, wherein the one or more voxels together form a composite image.

20. The method of claim 1, wherein the one or more voxels are arranged in rings and rows on the optical fiber.

* * * * *